Oct. 27, 1964  A. E. BACK ETAL  3,154,411
PROCESS AND APPARATUS FOR THE PRECIPITATION
OF COPPER FROM DILUTE ACID SOLUTIONS
Filed March 20, 1962  2 Sheets-Sheet 2
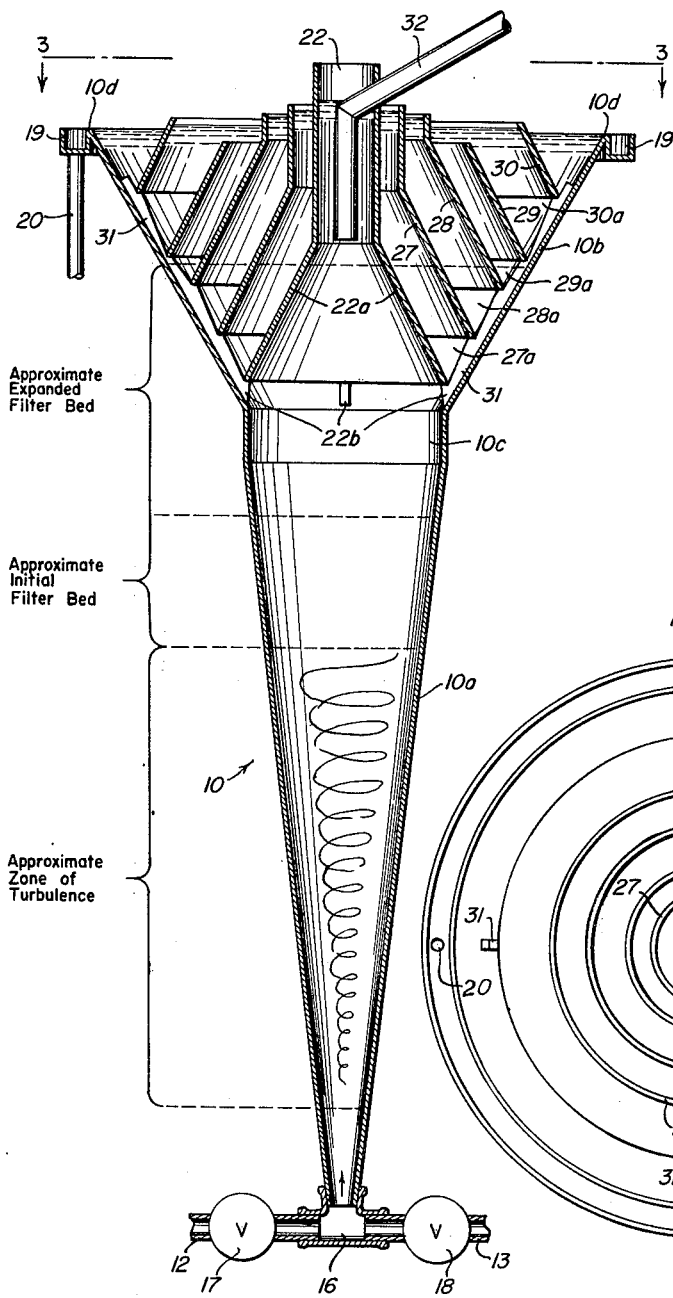
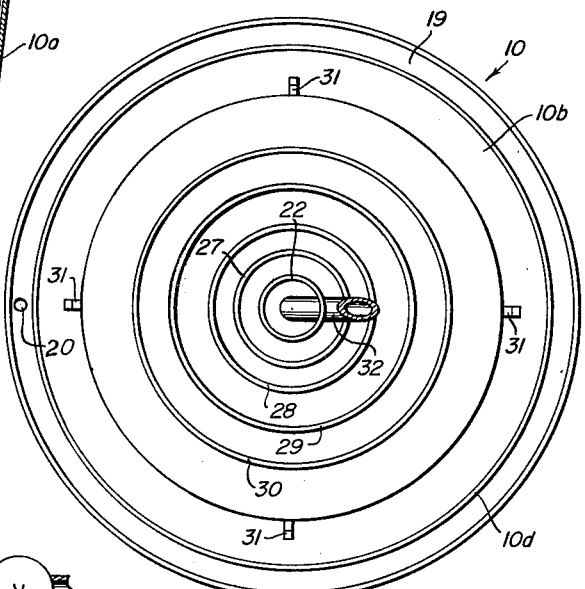
INVENTOR.
ALEXANDER E. BACK
KENNETH E. FISHER
JOHN KOCHERHANS
BY
ATTORNEYS

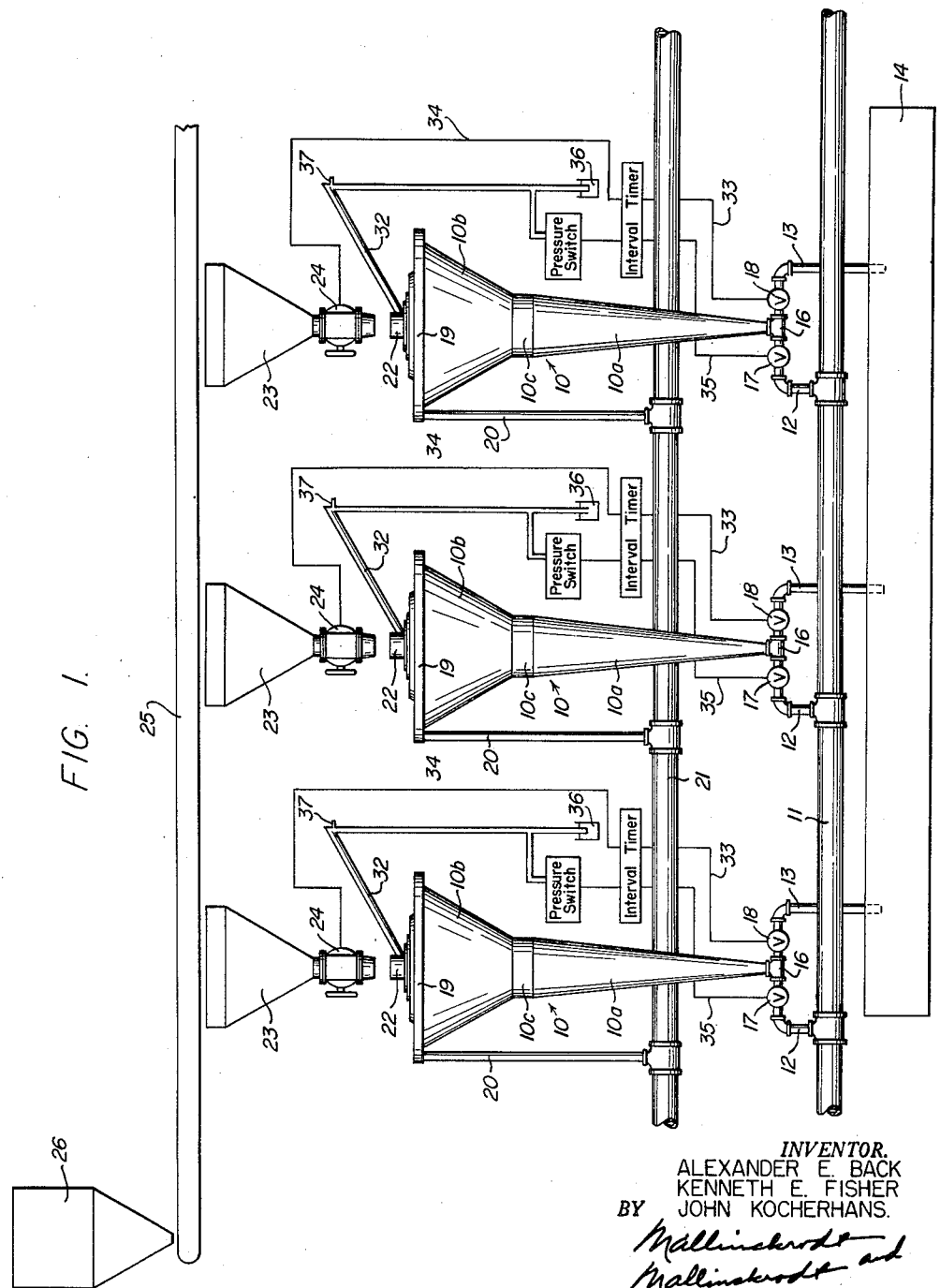

United States Patent Office 3,154,411
Patented Oct. 27, 1964

3,154,411
PROCESS AND APPARATUS FOR THE PRECIPITATION OF COPPER FROM DILUTE ACID SOLUTIONS
Alexander E. Back, Kenneth E. Fisher, and John Kocherhans, Salt Lake City, Utah, assignors to Kennecott Copper Corporation, New York, N.Y., a corporation of New York
Filed Mar. 20, 1962, Ser. No. 181,001
11 Claims. (Cl. 75—109)

This invention relates to processes and apparatus for precipitating metals from aqueous solutions. It has particular application to the precipitation of copper from highly dilute acidic solutions, especially natural mine waters and waters which have been percolated through waste dumps.

It has long been known that copper can be precipitated from copper-bearing, acidic mine waters and analogous aqueous solutions by contacting such a solution with a metal which is higher in the electromotive series than copper. Iron is normally preferred. One method widely used is to pass the acidic aqueous solution over a mass of waste or scrap iron, such as discarded and detinned cans and other scrap presenting broad contact areas. This method is effective, but does not always make efficient use of the iron. Moreover, large quantities of scrap are required on a continuing basis. It is not always easy nor possible to meet this requirement, inasmuch as iron scrap tends to be undependable in supply.

A metallic iron product known as "sponge" iron can be easily prepared in discrete particle form by most copper producers from readily available ore materials, and it is this product as well as other forms of metallic iron in finely divided condition, such as powdered iron, which is employed to particular advantage in the process of this invention.

The process is carried out on a semi-continuous basis, and involves actively and forcefully, i.e. dynamically, suspending the finely divided metallic precipitant in and by means of the solution to be treated, whereby the precipitant is intimately contacted by such solution and replaced by the metal value from solution with high efficiency. Successive batches of the precipitant are subjected to the action of a forcefully flowing stream of the solution under conditions insuring a high recovery of the dissolved value despite the very dilute nature of the solution.

Dynamic suspension of the precipitant by the solution to be treated is best accomplished in a vessel of inverted conical formation, by placing the precipitant in such vessel and flowing the solution upwardly therethrough at controlled velocity from the downwardly directed apex of the cone, the barren solution being permitted to overflow at the top of the vessel. This means that the dynamic suspending action will progressively decrease as the solution rises in the vessel and as its flow velocity decreases by reason of area increase, and that the solution will be relatively quiescent at discharge.

Such a dynamic suspending procedure is entirely new in the treatment of copper-bearing mine waters and similar dilute solutions with metallic iron, but the general principles involved have been suggested for the recovery of precious metals from solution by the use of suitable precipitants, such as finely divided carbon and zinc fume, see Sulman U.S. Patent No. 587,408 of August 3, 1897.

A major difficulty inherent in the procedure as applied to the treatment of copper-bearing mine waters and similar dilute solutions with metallic iron is the fact that gas is normally evolved by reason of the contact between the solution and the precipitant. Such gas rises through the solution and tends to carry particles of the precipitant and the precipitated values to the overflow level, resulting in substantial loss of values if such particles are permitted to flow to waste with the barren solution.

Sulman took care of particles carried to overflow with the solution by filtering the overflow. We have found, however, that filtration is not practical when dealing with the huge volumes of liquid involved in the treatment of dilute acid mine waters and waters which have been percolated through mine dumps. Moreover, gas evolved by reaction of the acid with the precipitant forms bubbles, which rise and burst at the surface and release substantial quantities of the finely divided solids where they are entrained in the overflow of barren solution.

In accordance with the present invention this difficulty is largely overcome by channeling the gas bubbles away from the overflow rim of the vessel and toward the longitudinal axis thereof, preferably by means of a series of concentric baffles—appropriately termed "burpers"—in the upper portion of the treatment vessel. These aid in the destruction of particle-laden bubbles at locations remote from and protected with respect to the overflow rim of such treatment vessel.

In treatment vessels of smaller capacity, say up to 500,000 gallons per day, it is necessary to utilize a very steep slope for the walls of the lower portion of the treatment vessel, say from 78° to 87° from the horizontal, in order to insure dynamic suspension of the precipitant, and, under these circumstances, to flare the upper portion of the treatment vessel outwardly at a considerably less angle, say 65°, in order to accommodate the gas-directing baffles and give a sufficiently broad surface area for the effluent solution to insure quiescence adjacent the overflow rim. As the capacity increases, the degree of slope of the lower portion of the treatment vessel is advantageously decreased, and, in the larger capacity treatment vessels, the slope of lower and upper sections are advantageously the same. In all instances it is desirable to have sufficient slope to preclude adherence of solid particles thereon.

An important aspect of the process in attaining maximum throughput, best utilization of the precipitant, and minimum loss of values in the effluent is the use of a mass of precipitant made up of random sized particles extending over a wide size range, the range of from about 10 to 200 mesh being typical. The larger particles tend to gravitate toward the bottom of the dynamically suspended mass, while the finer particles tend to move upwardly with the solution and, given proper regulation of the inflow velocity of the solution, tend to stratify well below the overflow rim of the treatment vessel, forming, in effect, a filter for the rising particles. Thus, the larger particles are contacted first by the inflowing liquid, which is relatively rich in the metallic value to be recovered, while the finer particles are contacted by the impoverished solution, as is desirable, and, additionally, aid significantly in preventing fine particles from being carried to the overflow level by bubbles of gas. There should be substantial quantities of both coarse and fine particles. It is preferred that at least approximately two thirds of the particles be plus 100 mesh.

For proper dynamic suspension it is necessary that the velocity of the influent solution be appropriately regulated. Too low a velocity will mean that the coarser particles are not suspended, that there is danger of channeling, and that action within the mass is sluggish, while too high a velocity will mean that the finer particles are entrained in the solution and are carried off at the overflow despite the baffles. Proper inflow velocity of the influent solution in any given instance will depend upon the design characteristics of the treatment vessel and the type and quality of the precipitant.

In the application of the invention to the recovery of copper from dilute acid solutions of same, a typical feed solution contains from about 0.4 to about 4.0 grams of copper per liter, while the barren solution contains only about 0.002 to about 0.008 gram of copper per liter, representing a recovery of over 99% of the copper. Thus over 99% of the copper has been replaced by the iron and practically all of the replaced or precipitated copper has been recovered.

From the above it can be seen that a principal object in the making of the invention was to provide a method for effectively utilizing sponge or powdered iron as a precipitant for the copper contained in such dilute acid solutions as natural mine waters and waters percolated through waste dumps, and to adapt, to the particular problems presented, prior knowledge relating to the dynamic suspension and intimate contacting of a finely divided precipitant by a metallic-value-bearing solution.

It can also be seen that principal novel features in the accomplishment of these objects are the use of a mass of precipitant of widely differing particle sizes and the substantially complete channeling of gas bubbles toward the axial center of the treatment vessel, as by the provision of a series of gas-bubble-diverting baffles in the upper section of the treatment vessel.

A complete processing system in accordance with the invention will usually include a number of the treatment vessels arranged to be individually supplied with the metal-bearing solution from a main supply conduit under the control of suitable valves, and arranged to discharge their respective batches of valuable metal particles under the control of additional valves, following replacement of the precipitant material by the metal in solution.

A feature of the invention, whether one or a number of the treatment vessels are involved, is control of the operation of each vessel on the basis of changes in pressure of gas discharging from such vessel. This lends itself very well to fully automated control of the operation on a suitably programmed basis.

A specific embodiment of apparatus representing what is presently regarded as the best mode of carrying out the process of the invention in actual practice is illustrated in the accompanying drawings.

In the drawings:

FIG. 1 represents, in side elevation and partly schematically, a fully automated, relatively small-capacity, industrial system of the invention for recovering copper from dilute acid mine waters or from dilute acid waters obtained by percolating water through waste dumps of copper ore;

FIG. 2, a longitudinal axial section through one of the treatment vessels making up the system of FIG. 3, the view being drawn to a considerably larger scale; and FIG. 3, a top plan view of such treatment vessel drawn to the same scale as FIG. 2.

Referring to the drawings:

The system of FIG. 1 is made up of three relatively small-capacity treatment vessels 10, whose construction and operation, as well as control of operation on an automated basis, are all directed in accordance with the invention toward the efficient recovery of copper from a dilute acid solution containing on the order of from 0.4 to 4.0 grams of copper per liter. Any suitable number of these vessels 10 may be employed as found appropriate in particular instances.

Feed solution is delivered to the vessels 10, at the lower ends thereof, from a header conduit 11 by means of respective feed pipes 12. Such pipes 12 lead into the vessels 10 in common with discharge pipes 13, which advantageously pass the slurry of copper-replaced iron precipitant, i.e. copper precipitate, from the treatment vessels into a holding tank 14 as such vessels are discharged periodically. From such holding tank the slurry is passed to filtration for recovery of the copper.

Each treatment vessel 10 is, in this instance, of composite, inverted, conical formation, having a steeply tapered lower section 10a and a relatively widely flaring upper section 10b. For convenience in fabrication and assembly and as an aid in directing upward travel of gas bubbles and free settling of entrained particles, a short cylindrical section 10c advantageously serves as a joinder between the inverted cone, i.e. lower section 10a, and the inverted frustrum of a cone, i.e. upper section 10b. Such cylindrical section 10c is also utilized to advantage in treatment vessels of larger capacity where the lower and upper sections may advantageously have the same degree of slope, e.g. about 65°.

It will be appreciated that the degree of slope of the walls of the lower section 10a of the treatment vessel largely determines the throughput capacity of the apparatus. Thus, the steeper the slope the less precipitant can be contained and the less the throughput capacity. Yet, the walls must slope sufficiently to insure effective suspension of the precipitant as the solution flows through the treatment vessel, for the steeper the slope the greater the velocity of the upflowing solution and the better the particle-suspending action of such solution.

The feed and discharge pipes 12 and 13, respectively, connect with the lower, vertexial end of such lower section 10a, as by means of a T pipe fitting 16, and are provided with control valves 17 and 18, respectively, which may be of ordinary manually operable type but which are preferably of power-actuated type arranged to be controlled automatically in accordance with pressure changes in the gas discharge portion of the apparatus.

When a valve 17 is open, feed solution enters the particular treatment vessel concerned, at the bottom, rises through the interior, and overflows at the rim 10d, FIG. 2, of the upper section into a peripheral launder 19, from where it is discharged through pipe 20 into a discharge header 21, FIG. 1, for the spent solution.

An appropriate quantity of finely-divided iron precipitant is charged into each treatment vessel 10 in any suitable manner, as, for example, through an axially located pipe 22 having an outwardly flared lower end 22a, FIG. 2. In the system illustrated, a supply sufficient for several chargings is maintained for the individual treatment vessels in respective feed bins 23 equipped with motorized rotary feeders 24. Such bins may themselves be charged in any suitable manner, as by means of a belt feeder 25 of well known type adapted to convey the precipitant from a storage bin 26.

As previously mentioned, the chemical reaction between the finely divided iron precipitant and the copper-bearing input solution results in evolution of hydrogen, which, as it bubbles upwardly through the liquid, appears to pick up and float fine particles of the copper precipitate. To prevent loss of such particles by overflow with the spent liquid into launder 19, there are provided in each treatment vessel 10 in accordance with the invention means for channeling or directing the bubbles of hydrogen away from the overflow rim 10d of the treatment vessel and toward the longitudinal axis thereof.

Such means preferably take the form of a series of concentric baffles in the upper section 10b of the treatment vessel. In the illustrated embodiment, FIGS. 2 and 3, the series is made up of lower baffles 27 and 28, having formation corresponding to that of the lower portion of pipe 22, an intermediate baffle 29, and an upper baffle 30, the latter two being of frusto-conical formation.

These baffles and pipe 22, through its baffle-forming lower end 22a, are supported by upper section 10b of the treatment vessel in suitably spaced relation to the inner wall face thereof, as by means of widely spaced seating strips 31. While the number of baffles utilized and the distances they are spaced from the supporting face of the treatment vessel can be varied considerably depending upon the circumstances, the arrangement illustrated has been found to yield excellent results. Intermediate baffle 29 is placed sufficiently close to the supporting wall face to divert a large part of the rising solution toward the axial center of the treatment vessel.

The bulk of the gas is caught by and discharged to atmosphere through pipe 22. This provides an excellent way of controlling operation of the system automatically. Thus, each treatment vessel 10 is advantageously equipped with a pipe 32 for tapping off gas diverted by baffle 22a into gas exhaust pipe 22 of such vessel, and for conducting it to a pressure-actuated electrical switch (indicated such in FIG. 1). The switch is wired to initiate operation of an interval timer (also indicated such in FIG. 1) upon a predetermined drop in gas pressure as the metallic iron is consumed by the reaction. Such timer is arranged and connected by suitable power transmission lines 33, 34, and 35 to carry out the following operations in suitably timed sequence for each operating cycle of the particular treatment vessel concerned:

(1) Close solution-inlet valve 17.
(2) Open copper-slurry-discharge valve 18.
(3) Close such valve 18 after a proper interval of time has passed.
(4) Open solution-inlet valve 17.
(5) Almost immediately thereafter or concurrently therewith, energize precipitant feeder 24 for predetermined time period.

While the interval timer may be de-energized in various ways, it is advantageous that it be of a type which will de-energize itself following this cycle of operation.

Pressure pipe 22 is equipped with a suitable pressure control device 36 and with pressure release port 37 to insure proper operation of the control system.

By using several treatment vessels as indicated, the individually automated units can be started sequentially so that one or more are working while the others are being discharged and refilled with precipitant. In this way, a continuous flow of solution can be processed without interruption.

The treatment vessels 10 are advantageously charged with precipitant following commencement of flow of solution into the lower section 10a thereof, so there will be immediate mixing of the two and dynamic suspension of the precipitant particles as they are charged into the vessel. The quantity of precipitant charged is based upon the volumetric capacity of such lower section, it being realized that the volume of the precipitant solids increases from about two to two and a half times during the reaction and that it is desirable to confine turbulence to the lower section.

The solution is introduced at the downwardly directed apex of a treatment vessel 10 from its pipe 12 at a rate sufficient to accomplish the desired dynamic suspension but not so great as to extend turbulence into the upper section 10b. The inflow rate will depend, of course, upon the size and shape of the treatment vessel and upon the physical characteristics of the precipitant. Thus, there is considerable difference in the reaction rate between sponge iron formed from magnetite and sponge iron made from roasted pyrite concentrates, due to differences in exposed surface areas. The sponge iron made from pyrite concentrates has considerably greater exposed surface area and is preferred for this reason.

It will be understood that, in the case of recovery of copper from acidic mine waters and analogous solutions using sponge iron or other finely divided iron as a precipitant, reactions proceed substantially as follows:

$$Fe + CuSO_4 \rightarrow Cu + FeSO_4 \quad (1)$$

and $$Fe + H_2SO_4 \rightarrow H_2 + FeSO_4 \quad (2)$$

Both reactions occur in the lower section 10a and continue so long as there is copper in the solution and available unreacted iron in the precipitant and precipitate particles. Near the apex or convergent lower end of such lower section, the precipitant is agitated vigorously by the incoming, copper-bearing, acidic solution. The dissolved copper in solution is substantially completely precipitated according to reaction 1. Hydrogen gas according to reaction 2 rises through the mobile bed of mixed precipitant and precipitate, being largely directed into pipe 22 by the baffled lower end 22a thereof. The remainder is caught and diverted by baffles or degassers 27–31 as the barren solution rises to overflow level.

There is no need nor ordinarily any advantage in capturing the gas diverted by such baffles or degassers 27–31, since it is quite minor in volume. Yet, if it were allowed to remain in the solution as bubbles, migrating therewith to the overflow rim, it would carry considerable of the recoverable values with it and such values would be lost. This is well demonstrated by the following comparative, laboratory tests utilizing sponge iron made from calcined pyrite as the precipitant and small scale treatment vessels with and without the baffles or degassers:

| Test No. | Loss of Sponge Copper, mg./liter | |
|---|---|---|
| | Without Degassers | With Degassers |
| 1 | 21 | 5 |
| 2 | 24 | 4 |
| 3 | 36 | 4 |
| Average | 27 | 4 |

The velocity of the upwardly flowing solution decreases as the horizontal cross-sectional area of the treatment vessel increases, and the degree of turbulence of the solution and the suspended particles therein decreases accordingly. The inflow rate of the solution is preferably adjusted to establish substantial quiescence near the top of the lower section of the treatment vessel and below the baffles or degassers. In this way, the aforementioned filter formed by stratification of the rising particles of precipitant and precipitate, see FIG. 2, is initially located below the baffles or degassers and is expanded upwardly as precipitation of copper progresses. During this time, it serves to catch the fine particles of precipitate, which are showered from above as bubbles carrying same break at the surface. The upwardly expanding, fine particle stratum serves, in effect, both as a filter for stripping particles from gas bubbles passing therethrough and as an umbrella for preventing fine particles, dropped by bubbles breaking at the surface, from falling back into the turbulent zone. While the above test results show that degassification of the rising solution is highly desirable in combination with the filtering feature of this invention, it is apparent that some useful results are had by reason of the upwardly expanding, dynamically maintained, filter stratum of finer particles, even without degassification. Thus, where facilities are already available for recovering such values as are carried off with the overflow solution, use solely of the filtering feature of the present invention may very well become an advantage. It should also be realized that, in either instance, the illustrated conical formation of the treatment vessel is preferred, but that tapered vessels of various polygonal cross-sections may be employed.

It is desirable to avoid prolonged agitation of the precipitant and precipitate bearing solution, so that colloidal copper is not formed. Generally speaking, anything over three hours is conducive to the formation of colloidal copper. That is why operation of a treatment vessel on a batch basis is called for. A retention time of about two hours for each batch of precipitant and precipitate has been found to be satisfactory, it being realized that the size of the charge and the flow rate of the feed solution are adjusted to this end, taking into consideration the characteristics of the precipitant and the treatment vessel.

That automated control of a system, as aforedescribed, is feasible within this time limitation is shown by data obtained from a pilot plant installation of a single treatment vessel conforming to FIG. 2 of the drawings and having an optimum loading of 500 pounds of precipitant with solution inflow rate of 220,000 gals. per 24 hours. Such data, based on utilization of sponge iron made from roasted pyrite concentrates to precipitate copper from acidic mine water containing 1.3 grams of copper per liter, as as follows:

| Elapsed time, minutes | Hydrogen Gas | | Copper Distribution in Barren Solution, Percent | | Percent Recovery of Cu |
|---|---|---|---|---|---|
| | Pressure, Inches of Water | Volume, c.f.m. | Soluble | Sponge Copper | |
| 0 | start of run | | | | |
| 9 | 0.1 | 0.9 | 0.5 | 0.1 | 99.4 |
| 28 | .7 | 1.4 | .5 | .1 | 99.4 |
| 46 | 1.2 | 1.8 | .5 | .1 | 99.4 |
| 61 | 1.7 | 2.1 | .5 | .1 | 99.4 |
| 76 | 1.9 | 2.4 | .5 | .1 | 99.4 |
| 91 | 1.9 | 2.4 | .5 | .1 | 99.4 |
| 107 | 1.7 | 2.1 | .5 | .1 | 99.4 |
| 121 | 1.1 | 1.9 | .5 | .1 | 99.4 |
| 129 | 0.6 | 1.6 | .5 | .2 | 99.3 |
| 132 | .5 | 1.3 | .5 | .3 | 99.2 |
| 139 | .3 | 1.1 | .5 | .4 | 99.1 |
| | end of run | | | | |

Results of typical tests conducted on various mine waters in a similar pilot plant operating at a solution inflow rate or velocity of 430 feet per minute, with respective charges of 500 pounds of sponge iron made from roasted pyrite concentrates, are given in the following table:

| | Heading Solution | | | | | Tailing Solution | | | | |
|---|---|---|---|---|---|---|---|---|---|---|
| | Analysis, g./l. | | | | pH | Analysis, g./l. | | | | pH |
| | Cu | Fe | Fe++ | Fe+++ | | Cu | Fe | Fe++ | Fe+++ | |
| A | 0.40 | 0.50 | (not determined) | | 2.4 | 0.005 | 1.25 | (not determined) | | 2.9 |
| B | 0.70 | 0.60 | (not determined) | | | 0.005 | 1.70 | (not determined) | | 3.5 |
| C | 0.74 | 0.77 | 0.02 | 0.75 | 2.6 | 0.006 | 2.10 | 2.09 | 0.01 | 3.5 |
| D | 1.40 | 0.50 | (not determined) | | 2.6 | 0.004 | 2.25 | (not determined) | | 3.5 |
| E | 2.08 | 0.42 | (not determined) | | 2.5 | 0.008 | 2.76 | (not determined) | | 3.7 |
| F | 1.40 | 2.45 | 2.13 | 0.32 | 2.9 | 0.002 | 4.00 | 3.93 | 0.07 | 4.2 |

In these tests, it was found that the velocity of the upwardly flowing solution had been reduced to 3 feet per minute at the filter bed and to 0.5 feet per minute at the overflow rim 10d.

By contrast, when copper precipitation was attempted in a launder charged with sponge iron, where the copper-bearing solution merely flowed over the iron, the latter was coated immediately with copper but consolidated into a mass of copper-coated iron in which the remaining iron became essentially unavailable and copper precipitation ceased.

Whereas there are here illustrated and described procedures and apparatus which we presently regard as the best mode of carrying out our invention, it should be understood that various changes may be made without departing from the inventive concepts particularly pointed out and distinctly claimed herebelow.

We claim:
1. A process of precipitating copper from dilute acid solutions thereof, comprising
    passing such a dilute acid solution upwardly through and beyond a mass of finely divided metallic iron,
    the solution being passed through the mass at a velocity effective to dynamically suspend the individual particles and to bring about intimate liquid-solids contact and replacement of most of the iron by copper, accompanied by evolution of gas;
    reducing the flow velocity of said solution as it rises, to establish a relatively quiescent stratum of finer particles above a turbulent zone of liquid-solids interaction;
    continuing to reduce the flow velocity of and degassing said solution as it rises above said stratum;
    and passing the degassed solution to discharge at a location upwardly remote from said stratum.
2. The process of claim 1, wherein degassification is effected by channeling the rising solution toward the axis of the body of solution and by discharging the solution peripherally of said body.
3. A process of precipitating copper from a continuously flowing stream of a dilute acid solution thereof, comprising
    passing solution from said stream upwardly through and beyond at least one mass of finely divided metallic iron of random particle sizes ranging between about 10 and 200 mesh with quantities of both coarse and fine sizes,
    the solution being passed through each mass at a velocity effective to dynamically suspend the individual particles and to bring about intimate liquid-solids contact and replacement of most of the iron by copper, accompanied by evolution of gas;
    reducing the flow velocity of the solution as it rises through each mass, to establish a relatively quiescent stratum of finer particles in each mass above a turbulent zone of liquids-solids interaction;
    continuing to reduce the flow velocity of and degassing the solution as it rises above the stratum of each mass;
    passing the degassed solution above the stratum of each mass to discharge at a location upwardly remote from said stratum;
    collecting and measuring gas derived from each mass; and
    utilizing the gas measurements to automatically direct flow of solution to at least one other like mass of finely divided metallic iron and to automatically replace the copper produced from the first mass or masses of metallic iron with a fresh mass or masses of metallic iron.
4. The process of claim 1, wherein the mass of finely divided metallic iron is made up of random particle sizes ranging between about 10 to 200 mesh with substantial quantities of both coarse and fine sizes
5. Metallurgical precipitation apparatus, comprising
    a treatment vessel of inverted substantially conical formation having an apex directed downwardly and an open base facing upwardly to define an overflow rim peripherally thereof;
    means for introducing into the treatment vessel at its said apex a metallurgical solution under pressure;
    and a series of degassing baffle conduits concentrically disposed in the upper portion of the treatment vessel concentric with the axis of said vessel, their lower ends being close to but spaced from the inner wall face of said vessel.
6. The apparatus of claim 5, wherein the several baffle conduits are upwardly convergent.
7. The apparatus of claim 5, wherein a gas take-off pipe leads from the interior of the innermost baffle con- duit; and means are provided for controlling inflow of the metallurgical solution in accordance with the quantity of gas generated within the treatment vessel.

8. The apparatus of claim 5, wherein the treatment vessel has a steeply tapered lower section and a widely flaring upper section, the baffle conduits being positioned in said upper section.

9. The apparatus of claim 5, wherein a relatively short intermediate portion of the treatment vessel is of substantially cylindrical formation.

10. A metallurgical precipitation system, comprising
a plurality of treatment vessels of substantially conical formation having their apices directed downwardly and their bases open and facing upwardly to define respective overflow rims peripherally thereof;
a header conduit, and respective piping connecting said conduit to the several treatment vessels, at the apices thereof, for introducing into said vessels a metallurgical solution under pressure;
a discharge conduit, and respective piping connecting said conduit to the several treatment vessels, at the apices thereof, for discharging contents from said vessels;
motorized shut-off valves in the inflow piping, respectively;
motorized shut-off valves in the discharge piping, respectively;
motorized feeders for charging the respective treatment vessels with a mass of finely divided precipitant;
a series of degassing baffle conduits for each treatment vessel, each series being concentrically disposed in the upper portion of its treatment vessel concentric with the axis of said vessel, the lower ends of the baffle conduits of the series being close to but spaced from the inner wall face of said vessel;
a gas take-off pipe for each treatment vessel, said pipe leading from the interior of the innermost baffle conduit of its treatment vessel;
and an automatic control system for each treatment vessel, each system including a gas sensing device connected to the gas take-off pipe of its vessel, an interval timer arranged for control by said sensing device, and means operably interconnecting said interval timer with the said inflow valve, the said feeder, and the said discharge valve for operating them in predetermined timed sequence.

11. The process for recovering metallic copper from an acidic solution of a copper salt, which comprises
passing said solution upwardly into a confined space of progressively increasing cross-sectional area from the bottom towards the top and effecting a progressively decreasing rate of flow as the solution rises in the spaced to an upper quiescent stratum;
providing in the solution in the space particles of iron varying in size from about 10 to about 200 mesh, said iron particles being suspended in the solution with the largest particles lowermost where the velocity is highest and progressively decreasing in particle size where the velocity is lowest;
removing spent solution from the quiescent stratum, the volume of solution and the amount of iron being regulated to substantially replace the iron, with the evolution of gas and the precipitation of copper;
separating the gas from the solution near the quiescent stratum;
and removing from the space liquid containing the precipitated copper.

References Cited in the file of this patent
UNITED STATES PATENTS

| | | |
|---|---|---|
| 587,408 | Sulman | Aug. 3, 1897 |
| 832,563 | Waterbury | Oct. 2, 1906 |
| 1,069,981 | Schaaf et al. | Aug. 12, 1913 |
| 1,223,454 | Weidlein | Apr. 24, 1917 |
| 1,321,985 | Crowe | Nov. 18, 1919 |
| 1,658,249 | McCluskey | Feb. 7, 1928 |
| 1,889,489 | Parker | Nov. 29, 1932 |
| 3,031,296 | Davey | Apr. 24, 1962 |

OTHER REFERENCES

Newton et al.: Metallurgy of Copper, 1942, John Wiley and Sons, Inc., New York, p. 319.